Patented Aug. 4, 1931

1,816,996

UNITED STATES PATENT OFFICE

HARVEY N. BARRETT, OF TIFFIN, OHIO, ASSIGNOR TO DOLOMITE INCORPORATED, OF MAPLE GROVE, OHIO, A CORPORATION OF OHIO

METHOD OF SEPARATING AND PREPARING LIME AND MAGNESIA

No Drawing. Application filed October 22, 1928. Serial No. 314,309.

The present improved method or process is particularly designed to introduce a new and simple cyclical process by the removal of part or substantially all of the lime from limestone, at the same time recovering or separating the lime in the form of a relatively pure merchantable compound. The process, however, is not necessarily limited to treatment of these particular raw materials but is adaptable to similar recovery of calcium where present as a calcined or calcinable compound along with other ingredients. The latter moreover, particularly where the raw material is dolomite, may constitute a valuable product after separation or recovery of the calcium therefrom.

I am aware that numerous attempts have heretofore been made to separate or rather recover lime and magnesia from dolomite and magnesian limestone or equivalent materials. However, many of such processes involve hydration of magnesium oxide and where thus hydrated it forms a gelatinous, non-settling mass that is extremely difficult to filter. Other such known processes require conversion of the magnesium into a soluble compound and then its precipitation in hydrated form. Moreover these processes generally involve the use of a reagent which is subsequently destroyed in the process and a new supply of this reagent must be employed. In my process the reagent is easily and conveniently regenerated and used again with practicaly no loss.

One object of the present improved process accordingly is to avoid the formation of such hydrated form of magnesia where dolomite, magnesian limestone or equivalent magnesium-calcium containing material is being worked. Since dolomite and magnesian limestone ordinarily contain small quantities of impurities in the form of one or more of the various compounds of iron, aluminum, silicon and manganese, the separation of the calcium oxide or the major portion thereof from the calcined raw material leaves such last mentioned compounds along with the magnesia in proportions such that the resulting material may be burned to a hard dense mass, said compounds in the form of the oxides of iron, aluminum, silicon and manganese serving to bond or sinter the mass into granular particles admirably adapted for use as a refractory material.

To the accomplishment of the foregoing and related ends, said invention, then, consists of the steps hereinafter fully described and particularly pointed out in the claims, the specific examples given illustrating but several of the various ways in which the principle of the invention may be utilized.

My improved process may be most conveniently described in its application to the treatment of dolomite, or magnesian limestone where the proportion of calcium carbonate to magnesium carbonate may vary from that in dolomite. The raw material after being broken or crushed to a suitable size is thoroughly calcined, the temperature being carried to a point where substantially all the carbon dioxide is removed. In fact the calcination may be carried to the so-called dead-burned condition, without detracting from the efficacy of the process. After calcination the material is desirably further crushed to pass a quarter inch or smaller mesh screen, in order to speed the reaction in the subsequent treatment described below.

Ignoring for the moment the other compounds hereinbefore referred to which may be present in small amounts as impurities, the product resulting from such calcination will consist of a mixture of calcium oxide and magnesium oxide in a ratio corresponding to that of their carbonates in the original material. Such mixture is thereupon treated with a 10 to 15 per centum solution of ammonium chloride ($NH_4Cl$).

Both calcium oxide and magnesium oxide are capable of reacting with such ammonium chloride in accordance with the following equations:

(1) $CaO + 2NH_4Cl + H_2O = CaCl_2 + 2NH_4OH$
(2) $MgO + 2NH_4Cl + H_2O = MgCl_2 + 2NH_4OH$

In other words, these reactions if allowed to proceed to completion form in the first case calcium chloride and ammonium hydroxide and in the second place magnesium chloride and ammonium hydroxide, as indicated, and all the compounds thus formed are soluble in water. However, in the presence of insufficient chloride to complete both reactions, the one with the calcium oxide will go to completion and the magnesium oxide will be reacted on only if ammonium chloride is present in excess of that required to complete such first reaction.

Accordingly, if just sufficient ammonium chloride is added to react with the calcium oxide, then little or no magnesium oxide passes into solution. Calcium oxide or lime is a much more active base than magnesium oxide or magnesia, has a greater affinity for acid than magnesia and also reacts more quickly. Otherwise stated, the reaction with calcium oxide is fast, i. e., is a matter of only two or three minutes, and proceeds at room temperature, no heating being required, and under these conditions, the magnesium oxide remains substantially unhydrated.

The calcium chloride solution containing ammonium hydroxide in solution (ammonia gas, $NH_3$, dissolved in water) is filtered from the magnesium oxide and such other insoluble impurities as may have been contained in the original material, and the calcium is thereupon precipitated in the form of calcum carbonate by passing carbon dioxide into the filtrate. At the same time the ammonium hydroxide in the calcium chloride solution regenerates ammonium chloride solution as shown by the following equation:

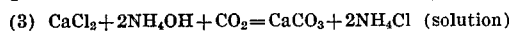
(3) $CaCl_2 + 2NH_4OH + CO_2 = CaCO_3 + 2NH_4Cl$ (solution)

Thus upon filtering off the precipitated calcium carbonate, I obtain the ammonium chloride solution for use over again in the process, in this way completing a simple cycle and producing as end products magnesium oxide and calcium carbonate.

The treatment of the mixture with ammonium chloride, of course, requires to be conducted in a closed vessel or other suitable form of container, inasmuch as ammonia begins to come off immediately the reaction starts. The strength of such ammonium chloride solution, moreover, should lie below the point where the resulting calcium chloride solution would have a calcium chloride content in excess of approximately 18 per cent. Otherwise there is a tendency for calcium chloride solution to react with the magnesium residue to form insoluble oxy chlorides. In practice, there is a further advantage in using a lower percentage than the maximum just indicated as permissible, namely, that the loss of ammonia will be less where working with a more dilute solution. The magnesia also settles out more readily from the dilute solution.

In such a cyclical operation there may arise through accident or defective equipment the possibility of the loss of free ammonia. Such a loss in ammonia in the circulating solution would prevent the precipitation of a corresponding amount of calcium chloride (as carbonate) and this would be carried through the entire cycle unchanged. The greater the loss in ammonia, the larger this dead load. To prevent this building up in the solution of this unreactive calcium chloride, it may be necessary at times to add to the carbonators a small amount of ammonia, sufficient to react with the excess calcium chloride in solution, thereby permitting a precipitation of calcium carbonate and the regeneration of ammonium chloride. An excess of ammonia above that necessary to react with the dead load of calcium chloride should be avoided to prevent a partial precipitation of calcium carbonate with the insoluble magnesia due to formation of ammonium carbonate in the carbonators when the carbon dioxide reacts with extra ammonia.

While in the foregoing example, I have referred to the use of ammonium chloride to dissolve out the lime, other ammonium salts capable of reacting with the lime to form soluble calcium compounds, such for example as ammonium acetate and ammonium nitrate, may be used with equally satisfactory results. However, the chloride, on account of its lower cost, is preferable in commercial practice. In carrying out the process where such nitrate or acetate is employed, the reactions occurring will correspond with those given above for the reaction with ammonium chloride, and the precipitation of the calcium carbonate is accomplished in the same manner, followed by the regeneration of whichever ammonium salt was used in the first instance.

Such regeneration and use over again of the ammonium salt is a distinct improvement in the art and is necessary to the successful operation of the process.

As hereinbefore indicated, the process may be regarded as directed either to the separation and recovery of the lime or to the beneficiation of the raw material in MgO by removal of the lime. For example, a dolomite or magnesian limestone may be taken which will contain in its raw state up to five per cent. or even more of the compounds of iron, aluminum, silicon and manganese or any of them. If such a dolomite or magnesian limestone, to which may be added additional fluxes, is calcined to a sufficiently high temperature to remove substantially all of the carbon dioxide, it may then be treated by the present process to extract enough lime so as to leave a residue containing for example ten per cent. of lime. The fluxing ingredients in this treated product are in an extremely sub-divided state, practically colloidal and in an ideal condition for combining with the other igredients on further calcination. This residue consisting principally of magnesium oxide with such relatively low percentages of lime and the other oxides named above may be thereupon further calcined to form a hard dense well-shrunk clinker valuable as a refractory.

The residue of magnesia and other ingredients referred to above as impurities or fluxing ingredients, especially where the lime has been practically entirely eliminated therefrom, may also be mixed with either additional fluxes or with raw or burned dolomite which has not been treated for the separation or recovery of the lime, or with both, and the mixture thereupon calcined, with the result that a new refractory is obtained having a much higher content of magnesia than where made directly from dolomite or magnesian limestone.

An impure magnesite containing in addition to the fluxing ingredients, compounds of calcium which upon calcination yield lime may be beneficiated in magnesia content by extraction of the lime in accordance with my main process. This beneficiated product is then calcined again with or without additional fluxes to produce a high grade magnesite refractory. Such process will also be of great utility in obtaining magnesia free from lime, suitable after calcination for use in making so-called magnesium oxy-chloride, or Sorel cements, from magnesite which contain lime after calcination. Likewise the magnesia left behind as the solid residue, where ordinary dolomite is treated in accordance with the present process, can by proper regulation of the amount of ammonium chloride or equivalent ammonium salt be made practically free from lime and so adapted by calcination for satisfactory use in cements of the kind just named.

In conclusion, I have found that my improved method or process for separating or recovering lime is effective even where the latter is combined with other oxides as in the case of calcium silicates and calcium aluminates, also calcium ferrate (although more slowly), the foregoing compounds being formed in and characterizing so-called dead-burned limestone. In fact, it is possible by this process to recover lime from ordinary Portland cement. This phase of the process is of more particular significance in that it makes impure limestones available for the production of pure calcium carbonate or whiting. In other words, the utility of the process is not limited to working with dolomite or magnesian limestones, where a valuable residue is produced, but, as just indicated, it may also be of commercial importance in the production of pure calcium carbonate as an end product in itself.

For the purpose of this specification, the term dolomite will be understood to connote any naturally occurring or artificially prepared combination or mixture of calcium and magnesium carbonates. Similarly, it will be understood that the lime resulting from the calcination of such material need not be present as such, but, at least in part, may be combined in a calcium silicate, calcium aluminate, or calcium ferrate, or any combination of these.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:

1. The method of treating material containing a calcinable compound of calcium along with other ingredients, which consists in calcining such material to convert such calcium compound into lime, treating the calcined material with a not to exceed 15 per cent. solution of an ammonium salt of an acid capable of forming a soluble calcium salt, whereby a solution of such calcium salt is obtained, and separating the latter from the residual material.

2. The method of treating material containing a calcinable compound of calcium along with other ingredients, which consists in calcining such material to convert such calcium compound into lime, treating the calcined material with a not to exceed 15 per cent. solution of an ammonium salt of an acid capable of forming a soluble calcium salt, whereby a solution of such calcium salt is obtained, separating the latter from the residual material, and then precipitating the calcium in the form of its carbonate.

3. The method of treating material containing a calcinable compound of calcium along with other ingredients, which consists in calcining such material to convert such calcium compound into lime, treating the calcined material with a not to exceed 15 per cent. solution of an ammonium salt of an acid capable of forming a soluble calcium salt whereby a solution of such calcium salt is obtained, filtering off the latter from the residual material, and then passing carbon dioxide into the filtered solution whereby the calcium is precipitated in the form of its carbonate.

4. The method of treating material containing a calcinable compound of calcium along with other ingredients, which consists in calcining such material to convert such calcium compound into lime, treating the calcined material with a not to exceed 15 per cent. solution of an ammonium salt of an acid capable of forming a soluble calcium salt, whereby a solution of such calcium salt is obtained, filtering off the latter from the residual material, then passing carbon dioxide into the filtered solution whereby the calcium is precipitated in the form of its carbonate and such ammonium salt is regenerated, and using such ammonium salt over again in treating more calcined material as before.

5. The method of treating dolomite, which consists in calcining the same to drive off substantially all the carbon dioxide, the calcium and magnesium being left in the form of lime and magnesia respectively, treating the calcined material with a solution of about 10 per cent. of an ammonium salt of an acid capable of forming a soluble calcium salt, whereby a solution of calcium salt is obtained, and separating the latter from the residual material.

6. The method of treating dolomite, which consists in calcining the same to drive off substantially all the carbon dioxide, the calcium and magnesium being left in the form of lime and magnesia respectively, treating the calcined material with a solution of about 10 per cent. of an ammonium salt of an acid capable of forming a soluble calcium salt, whereby a solution of calcium salt is obtained, separating the latter from the residual material, and then precipitating the calcium in the form of its carbonate.

7. The method of treating dolomite, which consists in calcining the same to drive off substantially all the carbon dioxide, the calcium and magnesium being left in the form of lime and magnesia respectively, treating the calcined material with a solution of about 10 per cent. of an ammonium salt of an acid capable of forming a soluble calcium salt, whereby a solution of calcium salt is obtained, filtering off the latter from the residual material, and then passing carbon dioxide into the filtered solution whereby the calcium is precipitated in the form of its carbonate.

8. The method of treating dolomite, which consists in calcining the same to drive off substantially all the carbon dioxide, the calcium and magnesium being left in the form of lime and magnesia respectively, treating the calcined material with a solution of about 10 per cent. of an ammonium salt of an acid capable of forming a soluble calcium salt, whereby a solution of calcium salt is obtained, filtering off the latter from the residual material, and then passing carbon dioxide into the filtered solution whereby the calcium is precipitated in the form of its carbonate and such ammonium salt is regenerated, and using such ammonium salt over again in treating more calcined material as before.

9. The method of treating material containing a calcinable compound of calcium along with other ingredients, which consists in calcining such material to convert such calcium compound into lime, treating the calcined material with ammonium chloride in not over 15 per cent. solution whereby such lime is converted into calcium chloride solution, and separating the latter from the residual material.

10. The method of treating material containing a calcinable compound of calcium along with other ingredients, which consists in calcining such material to convert such calcium compound into lime, treating the calcined material with ammonium chloride in not over 15 per cent. solution whereby such lime is converted into calcium chloride solution, separating the latter from the residual material, and then precipitating the calcium in the form of its carbonate.

11. The method of treating material containing a calcinable compound of calcium along with other ingredients, which consists in calcining such material to convert such calcium compound into lime, treating the calcined material with ammonium chloride in not over 15 per cent. solution whereby such lime is converted into calcium chloride solution, filtering off the latter from the residual material, and then passing carbon dioxide into the filtered solution whereby the calcium is precipitated in the form of its carbonate.

12. The method of treating material containing a calcinable compound of calcium along with other ingredients, which consists in calcining such material to convert such calcium compound into lime, treating the calcined material with ammonium chloride in not over 15 per cent. solution whereby such lime is converted into calcium chloride solution, filtering off the latter from the residual material, then passing carbon dioxide into the filtered solution whereby the calcium is precipitated in the form of its carbonate and ammonium chloride is regenerated, and using such chloride over again in treating more calcined material as before.

13. The method of treating dolomite, which consists in calcining the same to drive off substantially all the carbon dioxide, the calcium and magnesium being left principally in the form of lime and magnesia respectively, treating the calcined material with ammonium chloride in about 10 per cent. solution, whereby calcium chloride solution is obtained, and separating the latter from the residual material.

14. The method of treating dolomite, which consists of calcining the same to drive off substantially all the carbon dioxide, the calcium and magnesium being left principally in the form of lime and magnesia respectively, treating the calcined material with ammonium chloride in about 10 per cent. solution, whereby calcium chloride solution is obtained, separating the latter from the residual material, and then precipitating the calcium in the form of its carbonate.

15. The method of treating dolomite, which consists in calcining the same to drive off substantially all the carbon dioxide, the calcium and magnesium being left principally in the form of lime and magnesia respectively, treating the calcined material with ammonium chloride in about 10 per cent. solution, whereby calcium chloride solution is obtained, filtering off the latter from the residual material, and then passing carbon dioxide into the filtered solution whereby the calcium is precipitated in the form of its carbonate.

16. The method of treating dolomite, which consists in calcining the same to drive off substantially all the carbon dioxide, the calcium and magnesium being left principally in the form of lime and magnesia respectively, treating the calcined material with ammonium chloride in about 10 per cent. solution, whereby calcium chloride solution is obtained, filtering off the latter from the residual material, and then passing carbon dioxide into the filtered solution whereby the calcium is precipitated in the form of its carbonate and ammonium chloride is regenerated, and using such chloride over again in treating more calcined material as before.

17. The method of treating dolomite, which consists in calcining the same to drive off substantially all the carbon dioxide, the calcium and magnesium being left in the form of lime and magnesia respectively, treating the calcined material with ammonium chloride in about 10 per cent. solution, whereby such lime is converted into calcium chloride solution, and separating the latter from the residual material.

18. The method of treating dolomite, which consists in calcining the same to drive off substantially all the carbon dioxide, the calcium and magnesium being left in the form of lime and magnesia respectively, treating the calcined material with ammonium chloride in about 10 per cent. solution, whereby such lime is converted into calcium chloride solution, separating the latter from the residual material, and then precipitating the calcium in the form of its carbonate.

19. The method of treating dolomite, which consists in calcining the same to drive off substantially all the carbon dioxide, the calcium and magnesium being left in the form of lime and magnesia respectively, treating the calcined material with ammonium chloride in about 10 per cent. solution, whereby such lime is converted into calcium chloride solution, filtering off the latter from the residual material, and then passing carbon dioxide into the filtered solution whereby the calcium is precipitated in the form of its carbonate.

20. The method of treating dolomite, which consists in calcining the same to drive off substantially all the carbon dioxide, the calcium and magnesium being left in the form of lime and magnesia respectively, treating the calcined material with ammonium chloride in about 10 per cent. solution, whereby such lime is converted into calcium chloride solution, filtering off the latter from the residual material, and then passing carbon dioxide into the filtered solution whereby the calcium is precipitated in the form of its carbonate and ammonium chloride is regenerated, and using such chloride over again in treating more calcined material as before.

21. The method of treating material containing a calcinable compound of calcium along with other ingredients, which consists in calcining such material to convert such calcium compound into lime, treating the calcined material with a not to exceed 15 per cent. solution of an ammonium salt of an acid capable of forming a soluble calcium salt, whereby a solution of such calcium salt is obtained, filtering off the latter from the residual material, and then further calcining such residual material.

22. The method of treating dolomite, which consists in calcining the same to drive off substantially all the carbon dioxide, the calcium and magnesium being left principally in the form of lime and magnesia respectively, treating the calcined material with ammonium chloride in not to exceed 10 per cent. solution whereby calcium chloride solution is obtained, filtering off the latter from the residual material, and then further calcining the latter to form a refractory therefrom.

Signed by me this 28th day of September, 1928.

HARVEY N. BARRETT.